May 13, 1969 P. DOSCH 3,444,382
SLUB-CATCHER MEASURING APPARATUS WITH AUTOMATIC
SWITCHING FROM FIRST TO SECOND SENSITIVITY
Filed Feb. 9, 1966
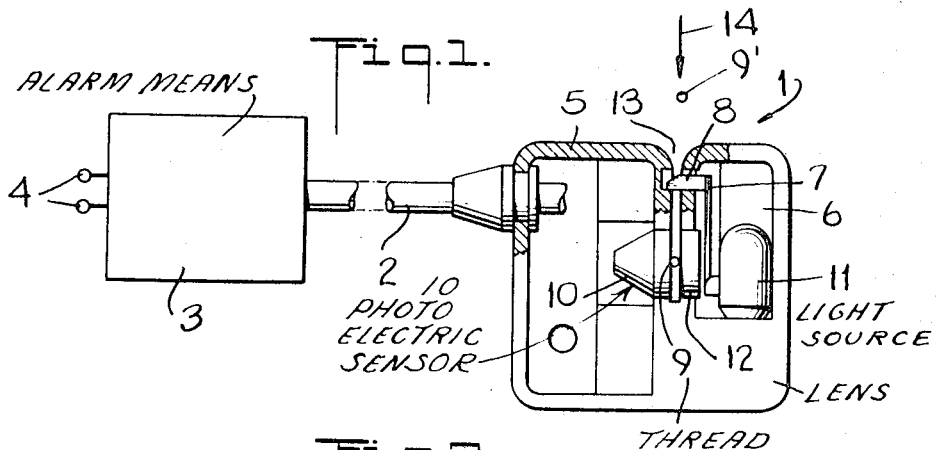
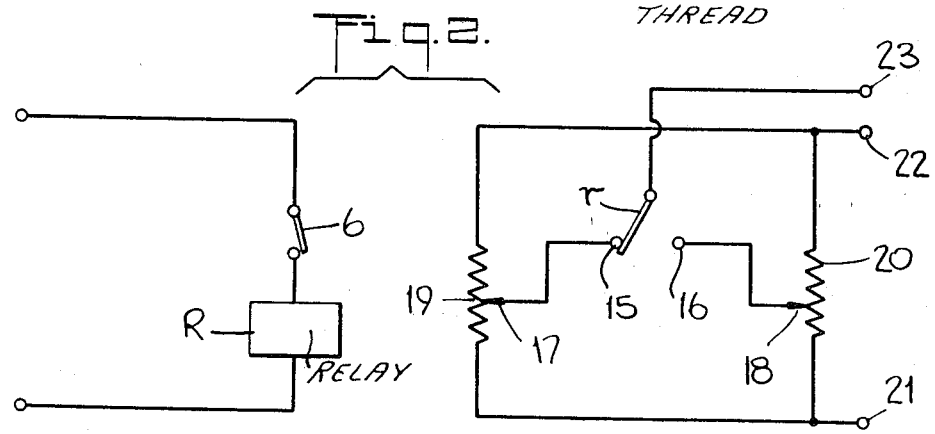
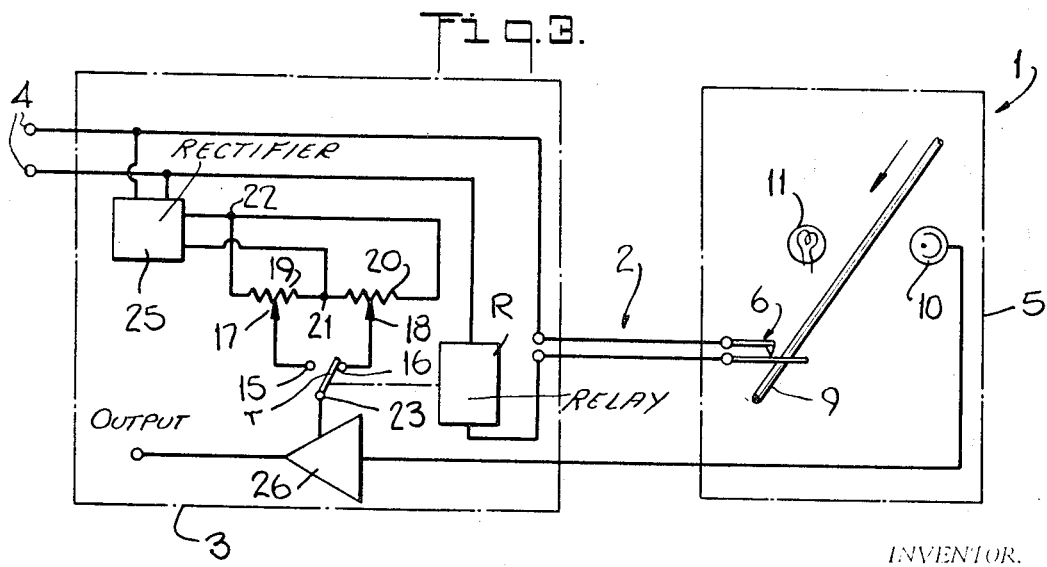
INVENTOR.
PETER DOSCH
BY
Ward Haselton, McElwany, True, Brooks & Fitzpatrick
ATTORNEYS

United States Patent Office 3,444,382
Patented May 13, 1969

3,444,382
SLUB-CATCHER MEASURING APPARATUS WITH AUTOMATIC SWITCHING FROM FIRST TO SECOND SENSITIVITY
Peter Dosch, Jona, Switzerland, assignor to Heberlein & Co. AG., Wattwil, St. Gall, Switzerland, a corporation of Switzerland
Filed Feb. 9, 1966, Ser. No. 526,233
Claims priority, application Switzerland, Mar. 17, 1965, 3,689/65
Int. Cl. G01n 21/30
U.S. Cl. 250—219    6 Claims

ABSTRACT OF THE DISCLOSURE

Apparatus detecting abnormal conditions in profile of cylindrical bodies of indefinite continuous length; sensing means including examining zone for detecting such conditions and means for varying sensitivity of same are provided; switch means controlling said last-mentioned means and operable upon insertion of cylindrical bodies to be examined into said examining zone to adjust said sensing means at one sensitivity for predetermined period of time and then at second sensitivity is also included and cooperates with alarm means responsive to said sensing means upon the occurrence of an abnormal condition.

---

This invention relates to apparatus known as slub-catchers for measuring the profile of cylindrical bodies of indefinite continuous length as they advance longitudinally between two points; and to improvements in such apparatur for measuring the uniformity of threads, yarn, wire and the like by means of a light source and a light responsive receiver.

Various types of slub-catchers, such as mechanical, photo-electric and capacitive types are known for the clearing of threads, that is for the detection and elimination of portions of threads when the cross-section of same changes beyond a predetermined amount. In such apparatus, the cross-section of the thread is continuously examined and a signal given or a portion of the thread automatically cut out and the ends tied when an undesirable increase in profile dimension occurs due, for example, to the existence on the thread of a slub. The sensitivity of the slub-catchers are adjustable according to yarn titer and preselected limits for acceptable variations in dimension.

Since, upon occasion, two threads instead of one are introduced into the slub-catcher for examination by mistake, and since, in such a case it is possible that no change in profile or cross-sectional dimension will occur while both threads run through the slub-catcher side by side, it is desirable that the apparatus recognize and indicate such a condition.

Thus, I have conceived by my invention a slub-catcher which not only recognizes faults such as slubs in a length of thread, but which also recognizes the introduction of two threads into the apparatus. In the first case changes in cross-section are noted; and in the second case, absolute measurement of cross-section is noted.

The present concept is based upon the realization that recognition of the introduction of two threads instead of a single thread into the apparatus is only necessary at the outset, that is, immediately after the introduction of the thread or threads. In essence then, the present invention is directed to a slub-catcher with sensing means for checking first the absolute cross-section of the thread as it is introduced into the apparatus and then, after a predetermined time delay, altering its sensitivity and checking the running thread for variations in cross-section beyond a given limit, such means being connected to an amplifier which gives an alarm signal, actuates means which cut the thread, or both when the cross-section exceeds the given value. Switching means are provided to alter the sensitivity after the desired time delay.

As a feature of my invention, I prefer to employ a photo-electric sensing device and an indicating and/or cutting apparatus connected with it. The sensing device may comprise a light source and a photo sensitive element between which the thread is introduced through a slot, and a switch operable upon introduction of the thread through the slot to actuate a control mechanism which in turn actuates means for altering the normal sensitivity and measuring scope of the sensing device so that its sensitivity is small but its range or scope is large so that the presence of two threads will be sensed and reported.

The control mechanism includes a time delay relay arranged so that the foregoing alteration is only briefly effective since, as stated, it is only necessary to check for the introduction of a plurality of threads at the outset of each threading operation. Upon completion of the time delay, the control mechanism returns the system to its normal condition wherein the scope or range of examination is relatively small and the sensitivity is relatively great, thus to report undesirable variations in cross-section of a single thread due, for example, to the existence of slubs.

The control mechanism may conveniently comprise a switch arranged for actuation by the thread en route to its examination position and the means for altering the sensitivity and range of the sensing device may comprise a pair of potentiometers operable alternatively according to the switch position and selected to emit high and low voltages, respectively. An amplifier having non-linear characteristics receives the output of whichever of the potentiometers is operating at any given time and its output controls the sensitivity of the amplifier and thus that of the photo sensitive element. Thur, in one case a given change in input voltage to the amplifier will produce a relatively small variation in output, while in the other, the same input change will produce a relatively large output variation. The first condition is employed for monitoring against the admission of a plurality of threads and the second condition is adapted for monitoring the thread for the presence of slubs.

There has thus been outlined rather broadly the more important feature of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification wherein:

FIG. 1 is a schematic view of a slub-catcher embodying my present invention;

FIG. 2 is a circuit diagram illustrating features of my invention; and

FIG. 3 is a further diagram illustrating my concept.

Referring now to the drawing in detail, there is shown a slub-catcher comprising a photo-electric sensing element indicated generally by the numeral 1, and an indicating and/or cutting apparatus indicated at 3, and which may be referred to cumlatively as alarm means, the latter being connected electrically with the sensing element 1 by a cable 2 connected to an alternating current source (not shown) by means of terminals 4. The sensing element 1 is contained within a housing 5 which also contains a microswitch 6 having an actuating arm 7 on the free end of which is a stop 8. A photo-electric element 10, which may be connected with a pre-amplifier, serves to sense the cross-section of thread positioned between it and a light source 11, the rays of which pass through a lens 12.

A slot 13 in the housing 5 allows entry of the thread 9 into sensing or examining position between the lens and the light responsive element from a position represented by the numeral 9' outside the housing. During movement of the thread into sensing position, the thread contacts the stop 8 moving arm 7 of the switch 6 to the right, as viewed in FIG. 1, against the force of a spring (not shown), thus closing the switch 6 for a brief period.

A time-delay relay R (FIGS. 2, 3) is provided in the indicator or cutting apparatus 3 and is connected in series with the switch 6 to control a single pole double throw contact r which normally contacts terminal 15 but which shifts to contact terminal 16 when relay R is energized. The terminals 15 and 16 are connected with terminals 17 and 18 of two potentiometers 19 and 20, respectively. These potentiometers 19 and 20 are connected in parallel between terminals 21 and 22 which are supplied with voltage from a rectifier 25 (FIG. 3). The voltage from the respective potentiometer to which the contact r is connected at any given time, is fed to an amplifier 26 as a regulating voltage which serves to amplify the signals from the photo-element 10. This regulating voltage determines the measuring range or scope and the sensitivity of the photo-element, and the terminals 17 and 18 are so adjusted in respect of the potentiometers that when potentiometer 19 is active, the measuring scope is relatively small and the sensitivity is relatively large; whereas, the contrary is true when the potentiometer 20 is active.

The amplifier output serves to actuate the signal and/or cutting devices upon the occurrence of an excessive difference between the cross-section of the thread and a predetermined value, as when a slub passes between the light source 11 and photo-element 10 in one case, or when a plurality of threads enter the examining position.

Upon admission of a thread 9 through the slot 13 and into examining position, the switch 6 is closed momentarily by the thread itself thereby energizing relay R and shifting contact r into engagement with terminal 16 so that the regulating voltage derived from potentiometer 20 is fed to the amplifier 26. In this case the amplifier sensitivity is small at the moment when the thread is introduced into examining position, but its scope or range is large because of the pre-adjustment of terminal 18 in respect of the potentiometer 20. Thus, if two threads instead of one are admitted to the examining area in the path of the rays passing from light source 11 to photo responsive element 10, this fact is reported to the alarm and/or cutting device.

If, on the other hand, only a single thread has been introduced, which will usually be the case, no report will be made and switch contact r will return to its normal position in engagement with terminal 15 after the time delay of the relay R. At this point, the regulating voltage of potentiometer 19 is effective, and the amplifier is very sensitive in the range of possible variations of cross-section of a single thread so that when a predetermined tolerance is exceed, the alarm and/or cutting device is actuated.

It will be appreciated that a number of possible variations may be made in the apparatus described without departing from the scope of the invention. Thus, for example, the sensing element may be of the capacitive or mechanical type, and any convenient type of switch such as a magnetic switch sold commercially under the trade description "Herkon" may be used instead of the particular one herein described.

From the foregoing description it will be understood that I contribute a slub-catcher that not only recognizes and reports the presence of slubs and the like, but also recognizes the introduction of a plurality of threads into the apparatus and reports this condition when it exists.

I believe that the construction and operation of my measuring apparatus will now be understood and that the advantages of my invention will be fully appreciated by those persons skilled in the art.

I claim:

1. In apparatus for detecting abnormal conditions in the profile of cylindrical bodies of indefinite continuous length, sensing means including an examining zone for detecting such conditions, means for varying the sensitivity of said sensing means, switch means controlling said last mentioned means and operable upon the insertion of the cylindrical bodies to be examined into said examining zone to adjust said sensing means at one sensitivity for a predetermined period of time and then at a second sensitivity, and means responsive to said sensing means upon the occurrence of an abnormal condition.

2. In apparatus for detecting abnormal conditions in the profile of cylindrical bodies of indefinite continuous length, sensing means including an examining zone for detecting such conditions, means for varying the sensitivity of said sensing means between two degress of sensitivity including switch means controlling said last mentioned means and operable upon the insertion of the cylindrical bodies to be examined into the examining zone to adjust said sensing means for a predetermined period of time to a sensitivity to cause said sensing means to respond to the presence of more than a single body in said examining zone, and then to a second sensitivity to respond to the occurrence of a slub-like abnormality on said body, means responsive to said sensing means, and means for advancing said body longitudinally through the examining zone.

3. Apparatus according to claim 2, further characterized in that said means for varying the sensitivity of said sensing means include a time delay relay.

4. In apparatus for detecting abnormal conditions in the profile of cylindrical bodies of indefinite continuous length, sensing means including an examining zone for detecting such conditions, means including adjustable potentiometers each arranged to furnish a preselected regulating voltage to control the sensitivity of said sensing means, selection means controlling the selection of a particular potentiometer for actuation and operable upon insertion of the cylindrical bodies to be examined into the examining zone to select a first potentiometer for actuation, means controlling the duration of such actuation, said selection means then actuating a second potentiometer, alarm means responsive to said sensing means, and means for advancing said body longitudinally through the examining zone.

5. Apparatus according to claim 4, further characterized in that said selection means includes a switch and wherein a time delay relay is energized by said switch to control the duration of actuation of said particular potentiometer.

6. Apparatus according to claim 4, further characterized in that said sensing means includes a sensing element and an amplifier receiving the output of said element.

References Cited

UNITED STATES PATENTS

| | | |
|---|---|---|
| 2,438,365 | 3/1948 | Hepp et al. |
| 2,641,960 | 6/1953 | Strother. |
| 2,682,191 | 6/1954 | Anderson. |
| 2,699,701 | 1/1955 | Strother et al. |
| 3,053,986 | 9/1962 | Loepfe et al. |
| 3,264,922 | 8/1966 | Peyer. |
| 3,305,687 | 2/1967 | Vinzelberg et al. |
| 3,309,754 | 3/1967 | Metcalf. |

RALPH G. NILSON, *Primary Examiner.*

M. A. LEAVITT, *Assistant Examiner.*

U.S. Cl. X.R.

88—14